United States Patent [19]

Boddy

[11] Patent Number: 5,483,385
[45] Date of Patent: Jan. 9, 1996

[54] ADJUSTABLE TRUCK MIRROR

[75] Inventor: Ian Boddy, Ada, Mich.

[73] Assignee: Lowell Engineering Corp., Alto, Mich.

[21] Appl. No.: 325,617

[22] Filed: Oct. 19, 1994

[51] Int. Cl.⁶ ............................. G02B 7/182; B60R 1/06
[52] U.S. Cl. .................... 359/841; 359/872; 359/881; 248/477; 248/480
[58] Field of Search ................................. 359/841, 865, 359/872, 881; 248/476, 477, 478, 479, 480

[56] References Cited

U.S. PATENT DOCUMENTS

| 2,526,306 | 10/1950 | Van Gelder | 248/480 |
| 3,463,439 | 8/1969 | Timms | 248/480 |
| 3,671,005 | 6/1972 | Schultz | 248/480 |
| 3,924,938 | 12/1975 | Carson | 359/872 |
| 3,954,328 | 5/1976 | Ames | 359/865 |
| 3,977,774 | 8/1976 | O'Sullivan | 359/865 |
| 4,558,930 | 12/1985 | Deedreek . | |
| 4,998,812 | 3/1991 | Hou | 359/841 |
| 5,039,055 | 8/1991 | Lempelius | 248/480 |
| 5,227,924 | 7/1993 | Kerper | 359/881 |

FOREIGN PATENT DOCUMENTS

| 3501157 | 6/1986 | Germany | 359/872 |
| 2193940 | 2/1988 | United Kingdom | 359/872 |

*Primary Examiner*—Ricky D. Shafer
*Attorney, Agent, or Firm*—Cushman, Darby & Cushman

[57] ABSTRACT

A side-view mirror comprises a fixed support fixed to the vehicle, and a U-shaped member including a bight portion secured to the fixed support and a plurality of legs extending from the bight portion outwardly from the vehicle. A moveable mirror housing has a receiving portion constructed and arranged to receive the legs of the U-shaped member, the mirror housing being manually engageable to be moved along a length of the legs upon application of sufficient manual force thereto to enable desired lateral positioning thereof for optimal side-view visibility. An engagement element is constructed and arranged to provide sufficient engagement between the receiving portion of the mirror housing and at least one of the legs of the U-shaped member to inhibit unwanted movement of the mirror housing along the legs when application of the manual force thereto is discontinued. In addition, a moveable mirror unit is secured to the mirror housing in angularly moveable relation with respect thereto to enable desired angular positioning of the mirror unit.

8 Claims, 2 Drawing Sheets

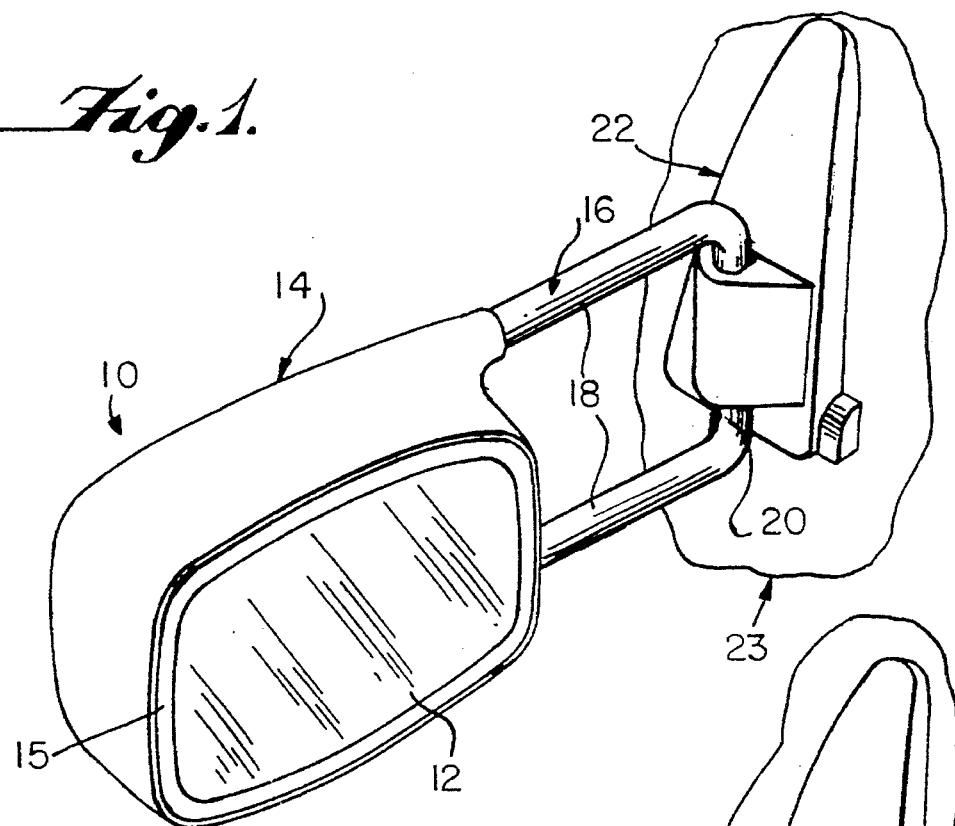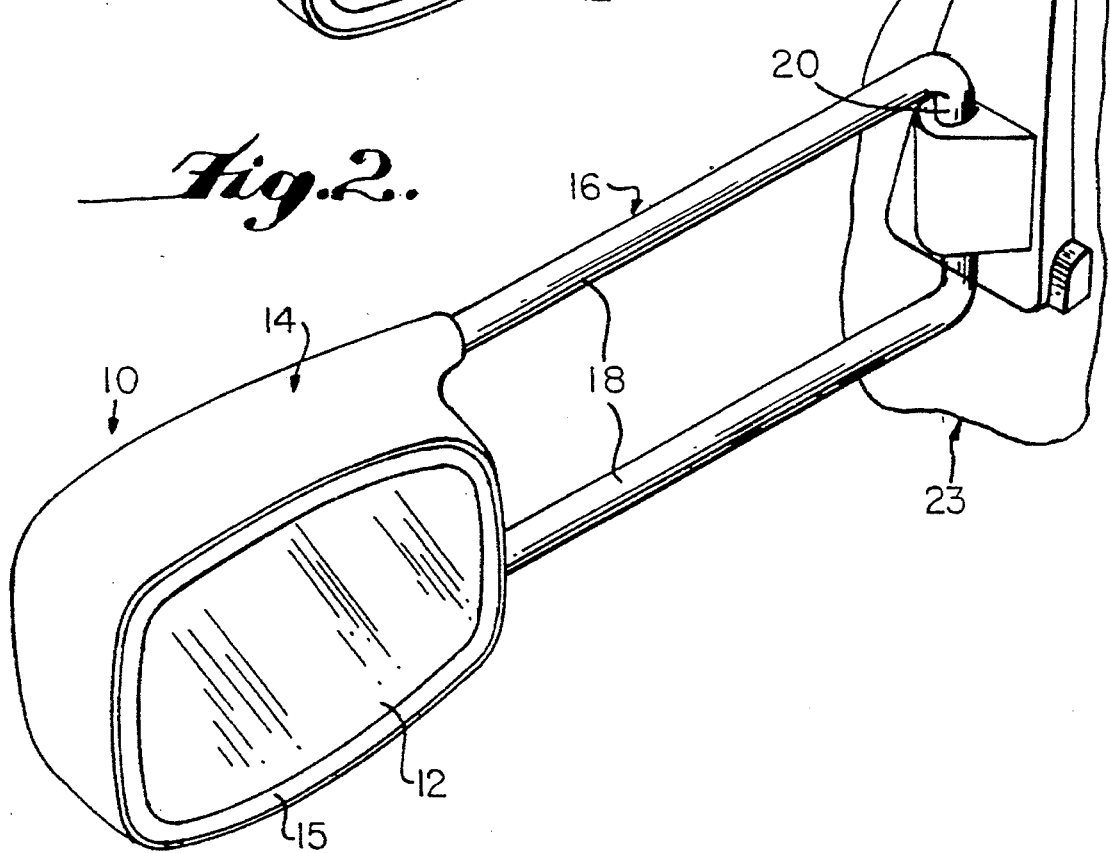

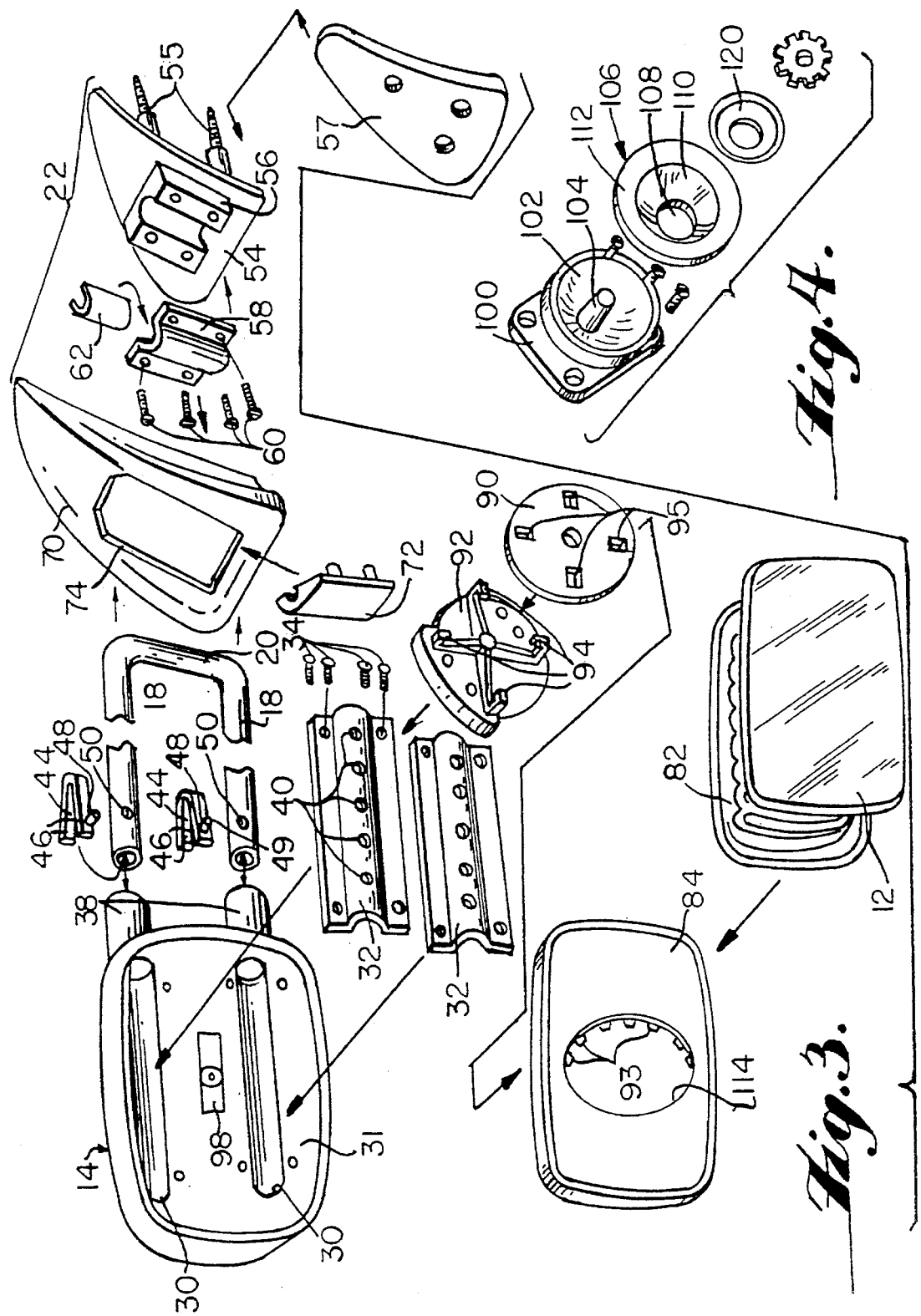

ADJUSTABLE TRUCK MIRROR

BACKGROUND OF THE INVENTION

This invention relates to an adjustable vehicle mirror, and more particularly to a mirror which can be both angularly adjusted and positionally adjusted towards or away from the vehicle.

Vehicles, such as trucks, are known to be provided with adjustable side-view mirrors typically positioned on both sides of the truck slightly ahead of the position in which the driver or passenger sits. It is important for such mirrors to be angularly adjustable to give the driver an optimal view of the rear surroundings on the sides of and to the back of the truck. The angular position of the mirror is adjusted not only to accommodate the requirements of different drivers (e.g., drivers of different heights are likely to require different angular positioning of the mirror), but also to accommodate changing requirements of the same driver as the size (length and width) of the truck trailer changes.

It is also known in the prior art that the mirror can be adjusted positionally towards or away from the truck or vehicle to change the view offered the driver. This is very useful when the size of the truck trailer is changed. For example, when a longer trailer is provided, it is normally desirable to position the mirror further away from the side of the truck.

U.S. Pat. No. 4,558,930 to Deedreek discloses a truck mirror which can be moved towards and away from the truck. However, the mirror assembly disclosed in that patent is problematic in a number of respects. For example, its construction is complex, does not permit angular movement of the mirror in the upward and downward directions, is expensive to manufacture, and is subject to easy breakage upon impact. Thus, the mirror assembly of Deedreek has not obtained wide acceptance.

It is an object of the present invention to provide a truck mirror assembly which overcomes the problems associated with the prior art, offers convenience in use, and is simple and inexpensive to manufacture.

To accomplish this object, there is provided a side-view mirror which comprises a fixed support fixed to the vehicle, and a U-shaped member including a bight portion and outwardly extending legs. The U-shaped member has the bight portion thereof secured to the fixed support, and has the legs thereof extending outwardly away from the vehicle. A moveable mirror housing has a receiving portion constructed and arranged to receive the legs of the U-shaped member, the mirror housing being manually engageable to be moved along a length of the legs upon application of sufficient manual force thereto to enable desired lateral positioning thereof for optimal side-view visibility. An engagement element is constructed and arranged to provide sufficient engagement between the receiving portion of the mirror housing and at least one of the legs of the U-shaped member to control movement of the mirror housing along the legs when application of the manual force thereto is discontinued. In addition, a moveable mirror unit is secured to the mirror housing in angularly moveable relation with respect thereto to enable desired angular positioning of the mirror unit.

These and other objects of the present invention will become more apparent during the course of the following detailed description and appended claims.

The invention may best be understood with reference to the accompanying drawings wherein an illustrative embodiment is shown.

BRIEF DESCRIPTION OF THE DRAWINGS

FIG. 1 is a perspective view showing the mirror assembly of the present invention in an unextended position from the vehicle.

FIG. 2 is a perspective view similar to that in FIG. 1, but showing the mirror assembly in an extended position from the vehicle.

FIG. 3 is an exploded view of the mirror assembly of the present invention.

FIG. 4 is an exploded view showing an alternate embodiment of the mirror adjusting assembly of the present invention.

DETAILED DESCRIPTION OF THE DRAWINGS

Referring now more particularly to FIG. 1, there is shown a side-view mirror assembly, generally indicated at 10. The mirror assembly 10 includes a mirror unit 12, and a mirror housing generally indicated at 14. Mirror housing 14 is preferably made from ASA material and is in the form of a shell-like casing and has an opening 15 for receiving the mirror unit 12.

The mirror assembly 10 also includes a U-shaped member, preferably made from polished stainless steel or aluminum generally indicated at 16. The U-shaped member 16 includes a plurality (two) of legs 18 and an integrally formed bight portion 20 connecting the legs 18 at a respective one end of each. The U-shaped member 16 is secured to a fixed support, generally indicated at 22, at the bight portion thereof. The fixed support is fixed to the side of the vehicle, generally shown by the portion indicated at 23.

The mirror housing 14 (including all components contained therein) is moveable along the legs 18 of U-shaped member 16 upon application of sufficient manual force thereto. This enables desired lateral positioning of the mirror housing, and thus mirror unit 12, for optimal side-view visibility. In FIG. 1, the mirror housing is shown in its unextended position, relatively close to the vehicle side 23. FIG. 2, in contrast, shows the mirror housing in an extended position relatively further away from the vehicle side.

Referring now more particularly to FIG. 3, there is shown an exploded view of the mirror assembly 10 of FIGS. 1 and 2. As shown, the mirror housing 14 includes generally tubular receiving portions, each defined by a respective groove 30 and clamp member 32. Each groove 30 is formed in a generally concave surface 31 of the mirror housing. Each clamp member is secured to the mirror housing in covering relation with respect to one of the grooves 30 by appropriate fasteners 34. Preferably the clamp members 32 are made from steel. The grooves 30 and their respective clamp members 32 form respective tubular receiving portions which receive the legs 18 of U-shaped member 16. The mirror housing 14 is also preferably provided with a pair of tubular guide members 38 for initially receiving and guiding legs 18 into their respective grooves 30.

The mirror assembly of the present invention is provided with a movement controlling mechanism for controlling the position of the mirror housing 14 along the legs 18. The preferred arrangement of such controlling mechanism will now be described.

Clamp members 32 are provided with a plurality of spaced notches or openings 40. These notches permit the mirror housing 14 to be secured at predetermined incremental spaces along the legs 18 of the U-shaped member. More specifically, as can be discerned from FIG. 3, the U-shaped member 16 is substantially hollow, and disposed within each of the hollow tubular legs 18 is a resilient engagement element 44. Preferably, the engagement element 44 comprises two bent elastic portions 46 which take a substantially hairpin shape. When compressed together, the elastic portions 46 provide an oppositely directed resilient force. The engagement elements 44 are each provided with a prong portion 48, and when engagement elements 44 are placed within the open ends of legs 18, they are positioned with the prong portions 48 being resiliently biased outwardly through an opening or notch 50 in the leg in which it is placed. It can be appreciated that when opening or notch 50 is aligned with one of the plurality of notches or openings 40 in clamp member 32, the prong 48 is biased outwardly through opening 50 and into the aligned opening 40. The prong 48 provides sufficient latching engagement between the receiving portion (i.e., clamp member 32) of the mirror housing and legs 18 to prevent unwanted movement of the mirror housing along the legs. It can be appreciated that if there is sufficient tension in the engagement elements 44, it may not be necessary to provide openings or notches 40 in the clamp members 32, as the shear friction between the engagement elements and the inner surface of clamp members 32 may provide sufficient engagement to prevent unwanted movement of the mirror housing 14 along legs 18. However, it is preferable to provide such notches 40, since they provide somewhat of a latching effect and reduce the likelihood of the aforementioned unwanted movement. It can also be appreciated that while two engagement elements 44 (one in each leg) are shown, only one need be provided to accomplish the intended function.

When an operator desires to change the lateral positioning of the mirror housing 14, it is simply necessary to manually engage the housing and move it laterally by application of sufficient manual force to cause the circular edge defining the notch 40 to abut against the rounded end 49 of prong 48 and thereby cause the elastic portion 46 carrying prong 48 to be brought towards the other elastic portion 46. Continued movement of housing 14 causes each prong 48 to then slidably engage the inner surface of clamp member 32 between openings 40, until it reaches the next opening 40, at which time the prong 48 is resiliently biased to enter such opening. At this time, the operator can feel a stoppage or discontinuity in the movement of mirror housing 14. The operator may then choose to leave the mirror housing in place, or continue to apply manual force to thereby disengage prong 48 from that particular opening in clamp 32 and continue movement of the housing until it reaches a desired lateral position and prong 48 enters the desired opening 40.

In FIG. 3, it can be appreciated that fixed support 22 includes a fixed support member 54 which is to be secured to the side of vehicle body (not shown in FIG. 3) by appropriate fasteners 55. It is preferable to place a thick foam pad 57 between support member 54 and the vehicle side to prevent unwanted rubbing therebetween and to form a weather sealant. The support member 54 is provided with a clamp assembly, including a clamp half 56 which is cooperable with a second clamp half 58 to secure the bight portion 20 of U-shaped member 16 therebetween. The clamp halves 56 and 58 are fixed to one another by appropriate fasteners 60. Preferably, a nylon insert 62 is provided between the bight portion 20 and the clamp half 58 to reduce frictional wear therebetween.

While clamp halves 56 and 58 generally prevent pivoting movement of U-shaped member 16 about bight portion 20, it is preferred that bight portion not be rigidly secured (i.e., via bolts) so that U-shaped member 16 is permitted to pivot about the axis defined by bight portion 20 if an unwanted impact in either the forward or reverse direction is applied to mirror housing 14 or legs 18. That is, the securement of bight portion 20 between clamp halves 56 and 58 should be sufficiently strong to prohibit unwanted pivotal movement during the vehicle operation, but should be sufficiently accommodating to permit such pivotal movement if, for example, mirror housing 14 is impacted by some foreign object (i.e., another vehicle).

The fixed support is preferably provided with an aesthetic cover member 70, made from ASA material, and which covers the securement of bight portion 20 between clamp halves 56 and 58. The cover member 70 includes a closure lid 72 that closes an opening 74 in cover member 70 through which legs 18 extend.

Disposed within mirror housing 14 is a mirror assembly which generally includes the mirror unit 12, a heating element 82 and a rigid polypropylene base 84 on which the mirror unit and heating element are both mounted.

It can be appreciated that the base 84, heating element 82, and mirror unit 12 comprise an assembly which can be mounted to mirror housing 14 through various different mountings, provided that such mountings permit adequate angular movement of mirror unit 12 within mirror housing 14 to accommodate the driver's needs. In a preferred embodiment, the mounting includes a nylon insert 90 and an electronically controlled mechanism 92 for electronically controlling the angular position of the mirror assembly. A similar type of electronically controlled mechanism is disclosed in U.S. patent application Ser. No. 08/106,883, which is hereby incorporated by reference. In this preferred arrangement, the mirror unit can be tilted upward, downward, left and right. The nylon insert is received in an opening 114 of base 84 and held in place by resilient fingers 93 surrounding the spring. The electronically controlled mechanism 92 includes a plurality of catches 94 which are secured to openings 95 in the nylon insert 90. The mechanism 92 is in turn secured to a mounting element 98 on the inner surface 31 of the mirror housing 14.

Shown in FIG. 4 is an alternate embodiment, wherein a manually adjustable mounting is provided for the mirror assembly. In this arrangement, a base member 100 is mounted on mounting element 98. Base member 100 includes a substantially concave surface 102 and a shaft 104 extending outwardly from a central portion thereof. A dish-like member 106 has a central aperture 108 extending through a central concave portion 110, and includes an outer annular rim 112 extending from concave portion 110. Preferably, the concave portion 110 is provided with a similarly shaped acetal liner 120. The dish-like member 106 is received in the central opening 114 in base 84, with a rearward surface of rim 112 (not shown) engaging the surface on base 84 generally surrounding central opening 114. Fingers 93 generally engage the convex back surface of member 106 to hold it in place. Shaft 104 extends through aperture 108, and a flexible washer member is secured to the end of shaft 104. The washer comes into abutment with liner 120 disposed in concave portion 110, to thereby secure base member 100, dish-like member 106, and liner 120 together.

It thus will be seen that the objects of this invention have been fully and effectively accomplished. It will be realized, however, that the foregoing preferred specific embodiment has been shown and described for the purpose of this invention, and is subject to change without departure from such principles. Therefore, this invention includes all modifications encompassed within the spirit and scope of the following claims.

What is claimed is:

1. A side-view mirror assembly for a vehicle which is controllably movable inwardly towards or outwardly away from said vehicle comprising:

a fixed support adapted to be fixed to said vehicle;

a U-shaped member including a bight portion secured to said fixed support and a pair of parallel legs extending from said bight portion outwardly away from said vehicle;

a movable mirror housing having a pair of spaced receiving portions constructed and arranged to receive said legs of said U-shaped member, said mirror housing being manually engageable to be moved into different positions of adjustment along a length of said legs upon application of sufficient manual force thereto to enable desired lateral positioning thereof;

at least one engagement element each constructed and arranged to provide sufficient engagement between one of said receiving portions of said mirror housing and a respective one of said legs of said U-shaped member to inhibit movement of said mirror housing along said legs when application of said manual force thereto is discontinued; and a movable mirror unit secured to said mirror housing in angularly movable relation with respect thereto to enable desired angular positioning of said mirror unit.

2. The side-view mirror assembly according to claim 1, wherein said U-shaped member is substantially hollowed, and each said at least one engagement element being disposed within said hollowed U-shaped member and therein, said engagement element having a portion thereof resiliently biased through an opening in said respective one of said legs and into engagement with said one of the receiving portions so as to inhibit said movement of said mirror housing along said legs when application of said manual force thereto is discontinued.

3. The side-view mirror assembly according to claim 2, wherein said respective receiving portion has a plurality of spaced notches, and wherein said mirror housing is movable along said legs to enable said engagement element to be selectively engaged with a desired one of said plurality of spaced notches to latch the mirror housing at the desired lateral position thereof.

4. The side-view mirror assembly according to claim 1, wherein said bight portion has a substantially cylindrical outer surface and wherein said fixed support comprises a pair of clamp halves defining a cylindrical mounting surface for securedly engaging said cylindrical outer surface of said bight portion 5. The side-view mirror assembly according to claim 1, wherein the fixed support provides sufficient engagement with said bight portion to inhibit unwanted pivotal movement of said U-shaped member, and to permit pivotal movement of said U-shaped member upon application of an unwanted forward or rearward impact of predetermined force on said mirror assembly.

6. The side-view mirror according to claim 5, further comprising an aesthetic cover for covering said fixed support.

7. The side-view mirror according to claim 1, further comprising a mechanism constructed and arranged to effect angular movement of said mirror unit so as to effect a desired angular position of said mirror unit in response to a remote manual movement by a user.

8. A side-view mirror assembly for a vehicle which is controllably movable inwardly towards or outwardly away from said vehicle comprising:

a fixed support adapted to be fixed to said vehicle and defining a mounting surface;

a U-shaped member including a bight portion having an outer surface disposed in engagement with said mounting surface, and a pair of parallel legs extending from said bight portion outwardly away from said vehicle and terminating in free ends;

a mirror housing having a pair of spaced receiving portions, said spaced receiving portions being constructed and arranged to telescopingly receive said free ends of said legs of said U-shaped member, said mirror housing being movable along the legs of said U-shaped member into different positions of adjustment toward and away from the vehicle to enable desired lateral positioning thereof;

a movement controlling mechanism constructed and arranged to control the position of said mirror housing along said legs; and a movable mirror unit secured to said mirror housing in angularly movable relation with respect thereto to enable desired angular positioning of said mirror unit.

* * * * *